United States Patent
Chen et al.

(10) Patent No.: US 6,633,830 B2
(45) Date of Patent: Oct. 14, 2003

(54) METHOD FOR SELECTING A COVER MATERIAL FOR USE WITH A VEHICLE SEAT BASED ON A FABRIC STRETCH REQUIREMENT

(75) Inventors: Pusheng Chen, Novi, MI (US); Ivana Vucelic, Wixom, MI (US); Donald C. Thompson, Wixom, MI (US)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 09/858,737

(22) Filed: May 16, 2001

(65) Prior Publication Data

US 2003/0033113 A1 Feb. 13, 2003

(51) Int. Cl.[7] .............................................. G06F 15/00
(52) U.S. Cl. ........................ 702/155; 73/777; 73/866; 280/743; 280/739; 297/218.1; 297/218.2; 297/218.4; 156/220
(58) Field of Search ...................... 702/155; 297/218.1, 297/218.2, 218.4; 53/258; 156/220; 38/102; 26/80; 66/193, 196; 280/743, 739; 73/777, 866

(56) References Cited

U.S. PATENT DOCUMENTS

| | | | |
|---|---|---|---|
| 3,763,483 A | | 10/1973 | Urmenyi |
| 4,317,301 A | * | 3/1982 | Timphony et al. ........ 297/218.1 |
| 4,343,103 A | * | 8/1982 | Murashima .............. 297/218.4 |
| 4,526,420 A | * | 7/1985 | Kawamura et al. ...... 297/218.1 |
| 4,541,885 A | * | 9/1985 | Caudill, Jr. .................. 156/220 |
| 4,845,925 A | * | 7/1989 | Thompson .................... 53/258 |
| 4,952,062 A | | 8/1990 | Bean, III et al. |
| 4,995,178 A | * | 2/1991 | Randolph .................... 156/220 |
| 5,209,084 A | * | 5/1993 | Robinson et al. ........ 297/218.2 |
| 5,326,150 A | * | 7/1994 | Robinson et al. ........ 297/218.2 |
| 5,347,732 A | * | 9/1994 | Padawer ..................... 38/102.4 |
| 5,408,770 A | * | 4/1995 | Suzuki ........................ 53/258 |
| 5,529,373 A | * | 6/1996 | Olson et al. ............. 297/218.4 |
| 6,199,246 B1 | | 3/2001 | Cibin et al. |
| 6,260,924 B1 | | 7/2001 | Jones et al. |

FOREIGN PATENT DOCUMENTS

| | | |
|---|---|---|
| JP | 359187209 A | 10/1984 |
| JP | 364000447 A | 1/1989 |
| JP | 03255946 A | 11/1991 |

* cited by examiner

Primary Examiner—John Barlow
Assistant Examiner—Aditya Bhat
(74) Attorney, Agent, or Firm—Bill C. Panagos

(57) ABSTRACT

A method for determining usability of a cover material as a cover of a vehicle seat component includes determining a fabric stretch requirement for the vehicle seat component; determining actual fabric stretch of the cover material; and comparing the actual fabric stretch with the fabric stretch requirement to determine whether the cover material is satisfactory for use with the vehicle seat component as the cover.

14 Claims, 1 Drawing Sheet

200

METHOD FOR SELECTING A COVER MATERIAL FOR USE WITH A VEHICLE SEAT BASED ON A FABRIC STRETCH REQUIREMENT

BACKGROUND OF THE INVENTION

1. Field of the Invention

The invention relates to a method for selecting a cover material for use as a cover of a vehicle seat component.

2. Background Art

Vehicle seats for use with a motor vehicle typically include a foam core covered by a seat cover. The seat cover may include an outer layer made of such materials as fabric, vinyl, or leather, and one or more other layers, such as a foam sheet and/or a scrim layer attached to the outer layer. Furthermore, the seat cover may be divided into a number of panels that are sewn together, or otherwise joined together, to form a desired shape.

Frequently, the materials to be used for the seat cover are selected at an early stage in the vehicle seat development process. For example, such materials may be selected prior to determination of the final contour of the vehicle seat. As a result, processability issues related to the seat cover may arise during the vehicle seat manufacturing process. For example, it may be discovered that the materials selected for the seat cover are not able to conform to the final contour of the vehicle seat without excessively wrinkling.

SUMMARY OF THE INVENTION

The present invention provides a method for determining processability and, therefore, usability of a cover material as a cover for a vehicle seat component based on a fabric stretch requirement for the vehicle seat component. As a result, potential cover materials can be screened at early stages of a vehicle seat program, and a suitable cover material can be effectively selected.

Under the invention, a method for determining usability of a cover material as a cover of a vehicle seat component includes determining a fabric stretch requirement for the vehicle seat component; determining actual fabric stretch of the cover material; and comparing the actual fabric stretch with the fabric stretch requirement to determine whether the cover material is satisfactory for use with the vehicle seat as the cover.

Determining a fabric stretch requirement may include determining a machine direction fabric stretch requirement, a cross-machine direction fabric stretch requirement, and/or a diagonal fabric stretch requirement. Furthermore, determining actual fabric stretch of the cover material may include determining actual machine direction fabric stretch, actual cross-machine direction fabric stretch, and/or actual diagonal fabric stretch.

The method may further include determining a component contour classification of the vehicle seat component, and/or thickness of a foam sheet, if any, of the cover material. The step of determining a fabric stretch requirement may then include determining the fabric stretch requirement based on the component contour classification and/or the foam sheet thickness. Advantageously, fabric stretch requirements may be provided in a look-up table that references component contour classification and/or foam sheet thickness.

These and other objects, features and advantages of the invention are readily apparent from the following detailed description of the preferred embodiments for carrying out the invention when taken in conjunction with the accompanying drawings.

DETAILED DESCRIPTION OF THE PREFERRED EMBODIMENT(S)

Typically, automobile manufacturers provide durability specifications for cover materials to be used as seat covers in vehicle seat applications. These specifications relate to such characteristics as material strength and wear resistance. These specifications, however, do not address material processability with respect to vehicle seat manufacturing processes. As a result, cover materials initially selected for use in particular vehicle seat applications are, sometimes, later found to be undesirable from a processing standpoint. For example, it may be discovered that a previously selected cover material is unable to adequately conform to a desired vehicle seat contour without exhibiting excessive wrinkling and/or tearing.

Realizing the need for a practical material processability standard, the inventors of the present invention have developed a stretch standard for use in determining processability and, therefore, usability of a cover material as a seat cover in a particular seat application. The stretch standard may be used to effectively screen multiple cover materials based on stretch characteristics, so that a sufficiently processable cover material may be efficiently selected. Furthermore, the stretch standard is intended for use with cover materials that include a fabric layer, such as a woven fabric layer, knit fabric layer, or other fabric layer, and that may also include one or more other layers, such as a foam sheet and/or a scrim layer, attached to or otherwise associated with the fabric layer. Such cover materials may be referred to as fabric cover materials.

Generally, the stretch standard provides a method for determining usability of a cover material as a seat cover of a vehicle seat or vehicle seat component, such as a seat bottom, seat back, armrest, headrest, or portion of any of the above elements. Furthermore, the method includes determining a fabric stretch requirement for the vehicle seat or vehicle seat component that will result in essentially no seat cover wrinkles due to stretch characteristics of the cover material. The method further includes determining actual fabric stretch of the cover material, and comparing the actual fabric stretch with the fabric stretch requirement to determine whether the cover material is satisfactory for use with the vehicle seat or vehicle seat component.

Figure 1:
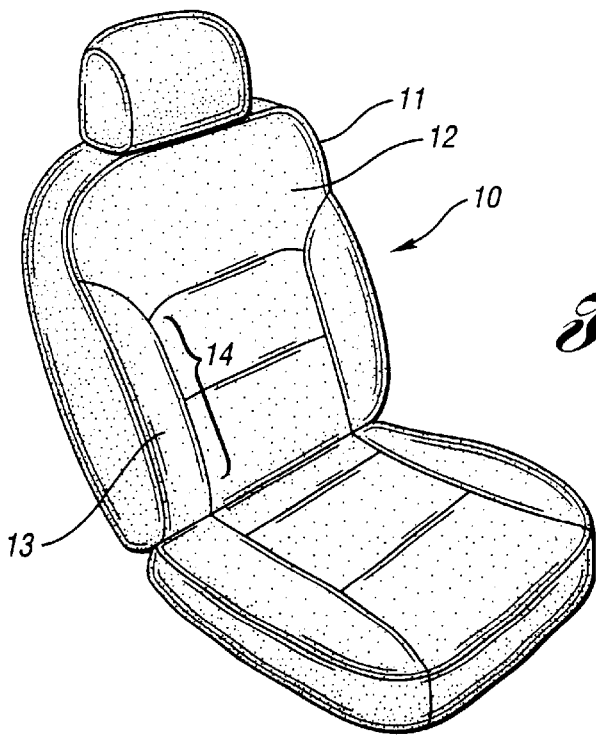
FIG. 1 is a perspective view of a virtual vehicle seat having a vehicle seat contour.

Referring to FIG. 1, a more detailed description of the method will now be provided. The method begins by obtaining a desired vehicle seat contour, which may also be referred to as final vehicle seat contour, of a vehicle seat 10 with which a proposed cover material is to be used as a seat cover or portion of the seat cover. This step may be accomplished in any suitable manner, such as by obtaining a virtual or electronic design of the vehicle seat contour, with or without a seat cover. Such an electronic design may be created, for example, by utilizing computer design software such as Unigraphics®, Alias®, Catia SDRC-IDEAS® and the like. Unigraphics® is available from Unigraphics Solutions, Inc. of Cypress, Calif.; Alias® is available from Alias Wavefront of Toronto, Ontario, Canada; and Catia SDRC-IDEAS® is available from International Business Machines Corporation of Armonk, N.Y. Furthermore, the vehicle seat contour preferably includes a component contour for each component of the vehicle seat 10.

Next, one or more conforming stretch requirements are determined for the vehicle seat 10 and associated vehicle seat contour, or for a component of the vehicle seat 10 and associated component contour. Conforming stretch requirements indicate the amount of stretch needed for a two-dimensional seat cover to conform to a three-dimensional shape of a vehicle seat contour with essentially no resultant wrinkles.

For a typical vehicle seat, a portion of the associated seat cover that covers a back bolster of the vehicle seat tends to require more stretch in order to conform to the vehicle seat contour than portions of the seat cover that cover other components or areas of the vehicle seat. This portion of the seat cover can be isolated as a panel, the boundary of which may be defined by seam lines such as sew lines. Within this panel, the center portion tends to bulge outwardly more than the boundary of the panel. As a result, the fabric near the center of the panel stretches more in order to conform to the vehicle seat contour. The fabric near the boundary, which typically is at a sew line or nearby a sew line, is either not stretched or only slightly stretched.

The three-dimensional contour of the panel can be seen as stretched out from a two-dimensional panel. A rectangular area or space within the panel can be further isolated with cross sections and work planes, as described below in detail. This rectangular area should cover the portion of the two-dimensional panel where no stretch, or very little stretch, is needed to conform to the corresponding three-dimensional contour. Furthermore, the rectangular area should also cover the portion of the two-dimensional panel that has to be stretched the greatest amount in order to conform to the corresponding three-dimensional contour. The boundary of the rectangular area along with the cross sections and work planes can be used to determine true line lengths, such as true arc lengths, of the three-dimensional contour at specific locations and directions. These true line lengths are stretched from the corresponding un-stretched lengths in the two-dimensional panel. The difference between the true line length and the un-stretched length at a specific location and direction may be used to determine a corresponding conforming stretch value. The highest conforming stretch value in a particular direction may be considered the conforming stretch requirement in the particular direction.

Figure 2:
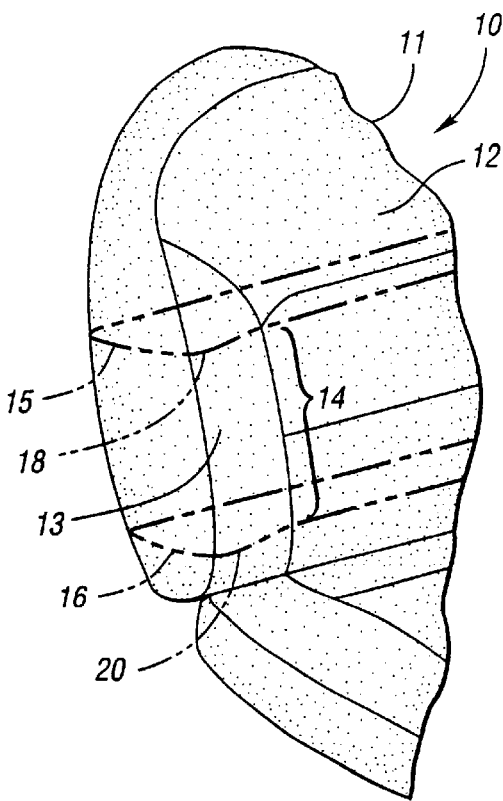
FIG. 2 is a fragmentary perspective view of the vehicle seat showing two work planes cut through the vehicle seat, and a sew line segment extending between the work planes.
Figure 3:
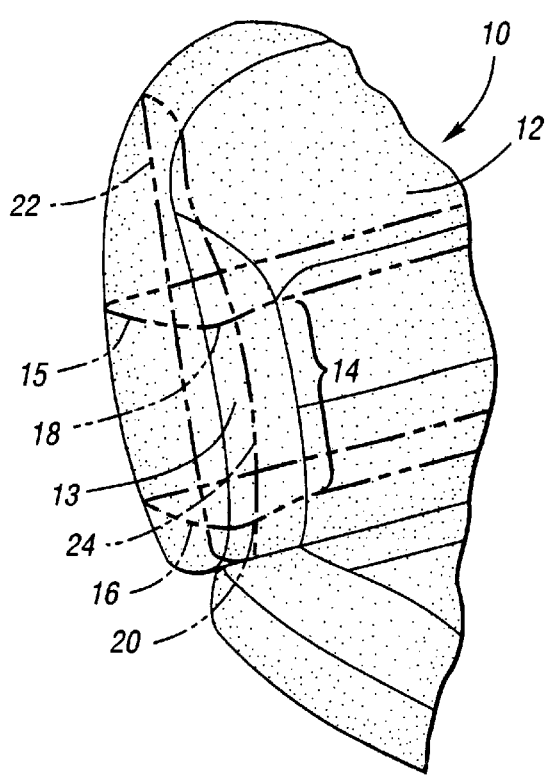
FIG. 3 is a fragmentary perspective view of the vehicle seat showing a cross-section cut through the vehicle seat, wherein the cross-section intersects a front surface of the vehicle seat back contour so as to define a surface line that extends between the work planes.

With reference to FIGS. 1–3, determination of a conforming stretch requirement in the up-down direction, for example, will now be described for seat back 11 of vehicle seat 10. It should be noted that FIGS. 1–3 represent an electronic design, such as a design developed using a computer, of vehicle seat 10, which includes a seat cover 12. Alternatively, determination of the conforming stretch requirement in the up-down direction, or other directions, may be accomplished using an electronic design of a body of vehicle seat 10, such as a foam core, without a seat cover. In such a case, the location of a seat cover may be approximated.

First, the component contour of seat back 11 is analyzed so as to select a surface portion, such as a panel 13 of seat cover 12, that appears to require the greatest amount of stretch. This step may be accomplished in any suitable manner, such as by visually inspecting the seat back 11. Next, the seam line or lines that encompass the panel 13, along with estimated back angle of a seat occupant, are determined. Estimated back angle may be determined, for example, through computer simulation.

A seam segment, such as a sew line segment 14, that extends in the up-down direction and that is generally straight or flat is then selected. Next, referring to FIG. 2, two parallel work planes 15 and 16 that are perpendicular to the estimated back angle are cut or otherwise established through the seat back 11 at opposite ends of the sew line segment 14, such that the work planes 15 and 16 intersect the panel 13 and define two boundary lines 18 and 20 that are disposed at opposite ends of the sew line segment 14. Preferably, the work planes 15 and 16 and associated boundary lines 18 and 20 are spaced as far apart as possible so that the conforming stretch requirement can be accurately determined. It should be noted that the work planes 15 and 16 may also be referred to as work lines.

Referring to FIG. 3, multiple cross sections, such as cross-car sections 22, are then cut or otherwise established through the seat back 11 such that the cross car sections 22 are perpendicular to the work planes 15 and 16 and intersect the panel 13 so as to define surface lines 24 extending between the boundary lines 18 and 20 (only one cross-car section 22 and corresponding surface line 24 are shown in FIG. 3). Typically, a spacing of about 15 millimeters between cross car sections 22 is recommended. However, spacing may be adjusted as needed for a particular application. For example, if a particular vehicle seat has a vehicle seat contour that includes significant curvature, then a closer spacing between cross car sections may be desirable.

Next, the length of each surface line 24 and the length of the sew line segment 14 are determined. The conforming stretch requirement (CS) in the up-down direction may then be determined using the following equation:

$$CS = \frac{\text{Longest surface line length} - \text{Sew line segment length}}{\text{Sew line segment length}} \times 100$$

If a generally straight or flat sew line segment, or other seam segment, cannot be located between the boundary lines 18 and 20, then the conforming stretch requirement in the up-down direction may be determined using the following equation:

$$CS = \frac{\text{Longest surface line length} - \text{Shortest surface line length}}{\text{Shortest surface line length}} \times 100$$

With either of the above equations, the conforming stretch requirement is determined as a percentage.

If multiple conforming stretch values are determined in the up-down direction for various portions of the seat back 11, then the largest conforming stretch value in the up-down direction may be established as the conforming stretch requirement for the entire seat back 11 in the up-down direction. Conforming stretch requirements for the seat back 11 may also be determined in other directions, such as a side-side direction or diagonal direction, using the process described above or a similar process. If different cover materials are to be used for different portions of the seat back 11, then conforming stretch requirements should be determined for each different portion.

Conforming stretch requirements for other components of the vehicle seat 10 may also be determined using the process described above or a similar process. If multiple conforming stretch values are determined in a particular direction for a particular component, then the largest conforming stretch value in the particular direction may be selected or otherwise established as the conforming stretch requirement in the particular direction for the particular component and associated component contour.

If the same cover material is to be used for the entire vehicle seat 10, then the largest conforming stretch value in a particular direction may be established as the conforming stretch requirement in that direction for the entire vehicle seat 10. Alternatively, if different cover materials are to be used for different components, then conforming stretch requirements for each of the components should be determined.

After the conforming stretch requirement or requirements have been determined, a classification for the vehicle seat contour or component contour may be determined using Table 1, which is shown below.

TABLE 1

| Requirement on Conforming Stretch | Seat/Component Contour (class) |
|---|---|
| CS ≦ 4% | Low |
| 4% < CS ≦ 10% | Medium |
| 10% < CS ≦ 12% | High |
| 12% < CS | Extra-high |

Table 1 provides an example of how vehicle seat contours or component contours may be classified based on conforming stretch requirements. For purposes of classification, the largest calculated conforming stretch requirement, regardless of direction, is used as the conforming stretch requirement for a particular vehicle seat contour or component contour. If, for instance, the maximum conforming stretch requirement for a particular vehicle seat contour falls between 4% and 10%, then the vehicle seat contour will be classified as a medium contour, according to Table 1. As another example, if the maximum conforming stretch requirement for a particular component contour, such as a headrest contour, falls between 10% and 12%, then the component contour will be classified as a high contour, according to Table 1. Alternatively, conforming stretch requirement ranges may be used to identify vehicle seat contour classifications or component contour classifications, without converting the ranges to verbal descriptions.

It should be noted that the conforming stretch requirements shown in Table 1 are determined based on configurations of vehicle seat contours, without regard to the amount of force necessary to conform seat covers to the vehicle seat contours. Furthermore, the conforming stretch requirements shown in Table 1 apply to all types of seat covers, regardless of the materials used in the manufacture of the seat covers.

Next, if the proposed cover material includes a foam sheet, thickness of the foam sheet is determined. Alternatively, if the proposed cover material does not yet include a foam sheet, but the particular vehicle seat application permits use of a foam sheet, then the anticipated thickness of the foam sheet may be determined or otherwise established.

Next, minimum and maximum fabric stretch requirements in various directions may be determined using a look-up table, such as Table 2 shown below for example.

TABLE 2

| Foam Sheet Thickness, mm | Minimum stretch, % | | | | | Maximum stretch, % |
|---|---|---|---|---|---|---|
| | ≦2 | 3–4 | 5–6 | 7–8 | ≧8 | All |
| Medium seat contour | | | | | | |
| Machine dir., % | 9 | 8 | 7 | 6 | 5 | 35 |
| Cross-machine dir., % | 9 | 8 | 7 | 6 | 5 | 35 |
| Diagonal, +45°, % | 14 | 12 | 12 | 11 | 11 | 35 |
| Diagonal, −45°, % | 14 | 12 | 12 | 11 | 11 | 35 |
| High seat contour | | | | | | |
| Machine dir., % | 11 | 10 | 9 | 8 | 7 | 35 |
| Cross-machine dir., % | 11 | 10 | 9 | 8 | 7 | 35 |
| Diagonal, +45°, % | 14 | 12 | 12 | 11 | 11 | 35 |
| Diagonal, −45°, % | 14 | 12 | 12 | 11 | 11 | 35 |

Table 2 provides fabric stretch requirements based on foam sheet thickness and vehicle seat contour classification or component contour classification, and the fabric stretch requirements indicate the stretch characteristics a particular cover material should have in order for the cover material to be able to conform to a particular vehicle seat contour or component contour with essentially no wrinkles due to stretch characteristics. Furthermore, Table 2 provides fabric stretch requirements in the machine direction, cross-machine direction and diagonal directions. The machine direction is the direction in the plane of a cover material parallel to the direction of manufacture, the cross-machine direction is the direction in the plane of a cover material perpendicular to the direction of manufacture, and diagonal directions are directions in the plane of a cover material extending at specified angles from the machine direction. For woven fabrics, the machine direction is known as warp direction and the cross-machine direction is known as fill direction. For knit fabrics, the machine direction is known as wale direction and the cross-machine direction is known as course direction. However, for knit fabrics, warp is frequently used in place of wale, and fill is used in place of course.

The fabric stretch requirements shown in Table 2 are based on extensive testing of various fabric cover materials with various vehicle seat contours and/or component contours. Under one test procedure, for example, a square grid is established on a particular cover material, and the cover material is then stretched so as to conform the cover material to a particular vehicle seat contour. Changes in spacing of points and/or lines of the grid are then noted in the machine direction, cross-machine direction, +45° diagonal direction and −45° diagonal direction. Next, fabric conforming stretch requirements are determined in each of these directions based on the changes in the grid.

A conforming force corresponding to each fabric conforming stretch requirement is then determined using any suitable approach. For example, strips having suitable dimensions, such as 25.4 mm×101.6 mm, and extending in various directions may be marked on the cover material when the cover material is stretched over the particular vehicle seat contour. The long sides of each strip are then cut through the thickness of the cover material. Next, each strip is cut in the middle along a direction parallel to the short sides of the strip so as to form two strip pieces. Because of the reduction in tensile forces, the strip pieces of each strip shrink in length as compared with the corresponding uncut strip. A force is then applied to one strip piece of each strip so as to stretch the strip piece back to its original position. This force is referred to as the conforming force. Each fabric conforming stretch requirement may then be referred to as a fabric stretch requirement at the corresponding conforming force. Each fabric stretch requirement at the corresponding conforming force is then correlated to a fabric stretch requirement at a 50 Newton stretch force applied over a width of approximately 25.4 mm so as to establish the fabric stretch requirements shown in Table 2. Numerous tests with various fabrics may be performed in order to establish the correlation between the fabric stretch requirements at corresponding conforming forces and the fabric stretch requirements at a 50 Newton stretch force. Thus, all of the fabric stretch requirements shown in Table 2 are based on application of a 50 Newton stretch force over a cover material width of approximately 25.4 mm. Alternatively, a table may be developed or otherwise provided with fabric stretch requirements based on a smaller or larger stretch force that is applied over a smaller or larger cover material width.

The maximum fabric stretch requirement shown in Table 2 provides an upper limit on fabric stretch values. It has been found that cover materials having fabric stretch values above this limit tend to be unstable during cover manufacturing processes, such as cut and sew operations.

As an example of how to utilize Table 2, fabric stretch requirements for a proposed cover material having a 3 millimeter thick foam sheet will now be determined. In order for such a cover material to be useable with a vehicle seat having a medium contour classification, or a vehicle seat component having a medium contour classification, the cover material should have a machine direction fabric stretch between 8% and 35%, a cross-machine fabric stretch between 8% and 35%, a +45° diagonal fabric stretch between 12% and 35%, and a −45° diagonal fabric stretch between 12% and 35%, according to Table 2. If no seat contour classification has been determined, medium seat contour classification may be assumed.

Next, actual fabric stretch values are determined for the proposed cover material. For example, one or more specimens of the proposed cover material may be tested according to ASTM D5034-95, Standard Test Method for Breaking Strength and Elongation of Textile Fabrics (Grab Test), in order to determine actual machine direction fabric stretch, actual cross-machine fabric stretch, actual +45° diagonal stretch, and actual −45° diagonal fabric stretch. The percent elongation in a particular direction of a particular specimen at a 50 Newton stretch force, or other force that is consistent with the force on which the fabric stretch requirements are based, may be considered the actual fabric stretch value for the particular direction.

Next, the actual fabric stretch values are compared with the fabric stretch requirements. If all of the actual fabric stretch values fall within the corresponding fabric stretch requirement ranges, then the proposed cover material is considered useable as a seat cover, based on stretch characteristics, for vehicle seat 10, or a specific component of vehicle seat 10, depending on whether the above process was carried out for the entire vehicle seat 10 or a specific component, such as seat back 11, of vehicle seat 10. If any one of the fabric stretch values falls below the corresponding minimum fabric stretch requirement, then the proposed cover material will likely exhibit excessive wrinkling and/or tearing if it is used with the vehicle seat 10. If any one of the fabric stretch values falls above the corresponding maximum fabric stretch requirement, then the proposed cover material will likely cause difficulties for cut and sew operations.

Because the method of the invention provides a means for determining processability of cover materials based on fabric stretch requirements, a suitable cover material may be efficiently selected for a particular vehicle seat application prior to beginning the seat manufacturing process. As a result, manufacturing issues related to insufficient or excessive stretch characteristics can be effectively avoided.

In addition to requirements regarding stretch, a cover material should also satisfy other requirements, such as requirements on rippling resistance and laminate wrinkle resistance, in order to achieve an essentially wrinkle free seat. Requirements for rippling resistance, laminate wrinkle resistance and other characteristics are covered in copending application Ser. No. 09/858,689, which is hereby incorporated by reference in its entirety.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A method for determining usability of a cover material as a cover of a vehicle seat component, the method comprising:

determining a fabric stretch requirement for the vehicle seat component;

determining actual fabric stretch of the cover material; and comparing the actual fabric stretch with the fabric stretch requirement to determine whether the cover material is satisfactory for use with the vehicle seat component as the cover, wherein the step of comparing the actual fabric stretch with the fabric stretch requirement is performed before proceeding to utilize the cover material in manufacturing of the vehicle seat component.

2. The method of claim 1 wherein determining a fabric stretch requirement includes determining a machine direction fabric stretch requirement, and wherein determining actual fabric stretch includes determining actual machine direction fabric stretch of the cover material.

3. The method of claim 1 wherein determining a fabric stretch requirement includes determining a cross-machine direction fabric stretch requirement, and wherein determining actual fabric stretch includes determining actual cross-machine direction fabric stretch of the cover material.

4. The method of claim 1 wherein determining a fabric stretch requirement includes determining a diagonal fabric stretch requirement, and wherein determining actual fabric stretch includes determining actual diagonal fabric stretch of the cover material.

5. The method of claim 1 further comprising determining a component contour classification for the vehicle seat component, and wherein determining a fabric stretch requirement includes determining the fabric stretch requirement based on the component contour classification.

6. The method of claim 5 further comprising obtaining a desired component contour of the vehicle seat component and determining a conforming stretch requirement for the desired component contour, and wherein determining a component contour classification comprises determining the component contour classification based on the conforming stretch requirement.

7. The method of claim 6 wherein determining a conforming stretch requirement includes establishing two parallel boundary lines on a surface of the desired component contour, establishing multiple surface lines on the surface of the desired component contour that are perpendicular to the boundary lines and that extend between the boundary lines, determining the length of each surface line, and dividing the difference between the length of the longest surface line and the length of the shortest surface line by the length of the shortest surface line.

8. The method of claim 6 wherein determining a conforming stretch requirement includes selecting a sew line segment associated with the desired component contour that is generally straight, establishing two parallel boundary lines on a surface of the desired component contour that are perpendicular to the sew line segment and disposed at opposite ends of the sew line segment, establishing multiple surface lines on the surface of the desired component contour that are perpendicular to the boundary lines and that extend between the boundary lines, determining the length of each surface line and the sew line segment, and dividing the difference between the length of the longest surface line and the length of the sew line segment by the length of sew line segment.

9. The method of claim 1 further comprising obtaining a desired component contour of the vehicle seat component, determining a conforming stretch requirement for the desired component contour in each of multiple directions, and wherein determining a component contour classification comprises determining the component classification based on the largest conforming stretch requirement.

10. The method of claim 1 further comprising determining thickness of a foam sheet of the cover material, and wherein determining a fabric stretch requirement further includes determining the fabric stretch requirement based on the thickness of the foam sheet.

11. The method of claim 1 further comprising:
   developing a look-up table that includes a plurality of fabric stretch values and references foam sheet thickness and component contour classification;
   determining a thickness of a foam sheet, if any, of the cover material; and
   determining a component contour classification for the vehicle seat component;
   wherein determining a fabric stretch requirement includes determining the fabric stretch requirement, based on the thickness of the foam sheet and the component contour classification, utilizing the look-up table.

12. A method for selecting a cover material for use as a cover of a vehicle seat component, the method comprising:
   determining thickness of a foam sheet, if any, of the cover material;
   determining a component contour classification of the vehicle seat component;
   determining a minimum machine direction fabric stretch requirement, a minimum cross-machine direction fabric stretch requirement and a minimum diagonal fabric stretch requirement, based on the thickness of the foam sheet and the component contour classification, utilizing a look-up table that references foam sheet thickness and component contour classification;
   determining a maximum machine direction fabric stretch requirement, a maximum cross-machine direction fabric stretch requirement and a maximum diagonal fabric stretch requirement utilizing the look-up table;
   determining actual machine direction fabric stretch, actual cross-machine fabric stretch and actual diagonal fabric stretch of the cover material;
   comparing the actual machine direction fabric stretch with the minimum machine direction fabric stretch requirement and the maximum machine direction fabric stretch requirement;
   comparing the actual cross-machine direction fabric stretch with the minimum cross-machine direction fabric stretch requirement and the maximum cross-machine direction fabric stretch requirement; and
   comparing the actual diagonal fabric stretch with the minimum diagonal fabric stretch requirement and the maximum diagonal fabric stretch requirement.

13. A method for selecting a cover material for use as a seat cover of a vehicle seat, the method comprising:
   determining thickness of a foam sheet, if any, of the cover material;
   determining a vehicle seat contour classification of the vehicle seat;
   determining a minimum machine direction fabric stretch requirement, a minimum cross-machine direction fabric stretch requirement and a minimum diagonal fabric stretch requirement, based on the thickness of the foam sheet and the vehicle seat contour classification, utilizing a look-up table that references foam sheet thickness and vehicle seat contour classification;
   determining a maximum machine direction fabric stretch requirement, a maximum cross-machine direction fabric stretch requirement and a maximum diagonal fabric stretch requirement utilizing the look-up table;
   determining actual machine direction fabric stretch, actual cross-machine fabric stretch and actual diagonal fabric stretch of the cover material;
   comparing the actual machine direction fabric stretch with the minimum machine direction fabric stretch requirement and the maximum machine direction fabric stretch requirement;
   comparing the actual cross-machine direction fabric stretch with the minimum cross-machine direction fabric stretch requirement and the maximum cross-machine direction fabric stretch requirement; and
   comparing the actual diagonal fabric stretch with the minimum diagonal fabric stretch requirement and the maximum diagonal fabric stretch requirement.

14. The method of claim 6 wherein obtaining a desired component contour of the vehicle seat component includes obtaining the desired component contour utilizing an electronic design of the vehicle seat component.

* * * * *